United States Patent [19]

Horian

[11] Patent Number: 4,973,507

[45] Date of Patent: Nov. 27, 1990

[54] THIN WOOD LAMINATE PANEL AND METHOD OF FABRICATION

[76] Inventor: Richard C. Horian, 627 N. Rossmore Ave., #408, Los Angeles, Calif. 90004

[21] Appl. No.: 301,027

[22] Filed: Jan. 23, 1989

[51] Int. Cl.⁵ .............................................. B32B 3/06
[52] U.S. Cl. ..................................... 428/102; 428/68; 428/120; 428/131; 428/134; 428/137; 428/168; 428/192; 428/220; 281/29; 281/36; 281/37; 206/450
[58] Field of Search ................. 428/168, 120, 134, 68, 428/131, 192, 102, 137, 220; 206/450; 281/29, 36, 37

[56] References Cited

U.S. PATENT DOCUMENTS

| | | | |
|---|---|---|---|
| 1,744,203 | 1/1930 | Becker | 144/329 |
| 2,214,675 | 9/1940 | Jensen | 428/134 |
| 4,747,721 | 5/1988 | Horian | 412/3 |

Primary Examiner—Ellis P. Robinson
Assistant Examiner—J. Weddington
Attorney, Agent, or Firm—Poms, Smith, Lande & Rose

[57] ABSTRACT

A thin wood dimensionally stable flat laminate panel made out of one or more wood veneer sheets attached to one or more sheets of core ply material such as chipboard by adhesive. The thickness of the panel is in the range of from about 0.080 inches to about 0.180 inches. Apertures passing through the panel are positioned around or arranged along the edges of the panel in order to decrease warpage of the panel due to moisture passing to and from the wood veneer sheets at the edges of the panel as a result of moisture passing to the atmosphere from the sheets and from the atmosphere to said sheets. The apertures are preferably spaced the same distance apart. The apertures may be formed by using a commercial sewing machine to position the stitching along the edges of the panel. The stitching provides a capillary "wicking" action facilitating venting of the moisture from the wood veneer sheets to the atmosphere. Stitching may also be used to attach a bias cover material around the edges of the panel. The bias cover material helps to prevent splintering and cracking of the edges of the panel as well as adding a decorative appearance without decreasing the "wicking" and venting action of the stitching and apertures around the edges of the panel. The thin wood laminate panel may be used for notebook covers, clipboards, folios, book covers, decorative boxes, table tops, or many other applications.

10 Claims, 3 Drawing Sheets

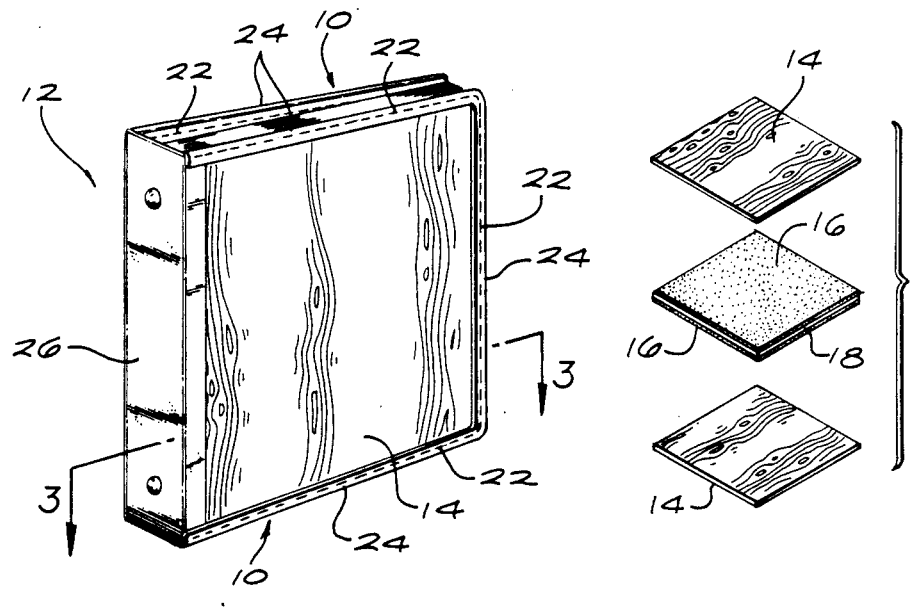
FIG. 1
FIG. 2
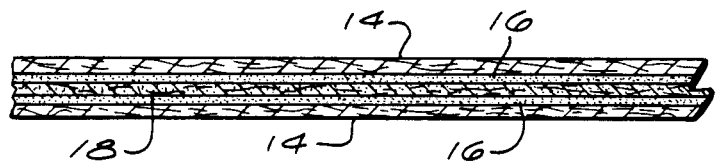
FIG. 3
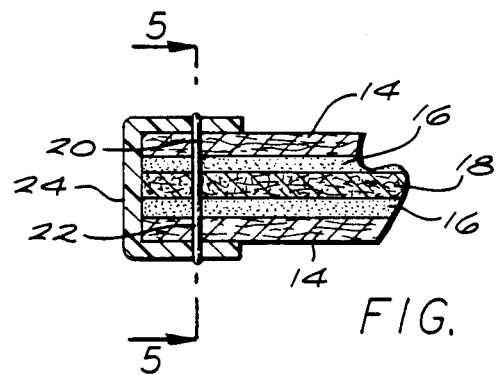
FIG. 4

4,973,507

THIN WOOD LAMINATE PANEL AND METHOD OF FABRICATION

BACKGROUND OF THE INVENTION

The present invention relates generally to wood panels made out of veneer sheets and to the methods of fabricating such panels and, more particularly, to a thin wood laminate panel made out of one or more wood veneer sheets having apertures passing through the panel spaced equidistant apart along the sides of the panel in order to decrease warping of the panel.

In the past, various methods have been used to reinforce veneer or to help keep the veneer from splitting or cracking. For example, U.S. Pat. No. 1,744,203, issued to Becker on Jan. 21, 1938, describes a method of decreasing splitting or minimizing expansion or contraction during drying of veneer by stitching layers or sheets of wet or green veneer at right angles to the grains of the wood and parallel to and spaced at some distance from the longest sides of the veneer sheets. Any number of parallel rows of stitching may be used. U.S. Pat. No. 3,856,600, issued to Fields on Dec. 24, 1974, discloses a method of sewing together with parallel rows of thread or fiber cord green sheets of veneer assembled side by side. The thread is stitched in rows spaced from edges of the sheets and across (transverse to) the wood grain and is chosen so that it shrinks at about the same rate as the green veneer during subsequent drying of the veneer. The dried stitched sheets of veneer are later used to manufacture plywood panels. A method of reinforcing a veneer sheet is described in U.S. Pat. No. 4,269,883, issued to Hasegawa on May 26, 1981. A cord is thrust through the veneer sheet at different intervals and intermediate ends of splits in the sheet and the projecting portions of the cord are formed into fastening means by melting or deforming the projecting portions, or applying an adhesive to the portions in order to prevent the cord from pulling free of the sheet. Cords are shown positioned parallel to a side of the veneer sheet, and in a zigzag fashion along cracks or splits in the sheet.

U.S. Pat. No. 2,018,712, issued to Elmendorf on Oct. 29, 1935, describes a method of treating a wood panel or sheet of wood to minimize warping by cutting part way through the thickness of the panel or sheet parallel to the wood grain providing a number of narrow strips held together- by connecting webs of wood. The sheet or panel is then stressed across the grain causing the webs to divide into small strands. The gaps between the narrow strips may then be filled with elastic material which bonds to the wood, such as rubber latex, allowing the panels to expand and contract. Continuous surface panels on a door frame cover a core having uniformly distributed perforations throughout the core body are provided to prevent warpage due to changes in temperature and humidity conditions, are described in U.S. Pat. No. 2,214,675, issued to Jensen on Sept. 10, 1940. Finally, French Patent No. 882,675, issued to Couelle and dated June 10, 1943, discloses the use of pegs forced into apertures in planks of wood.

One of the conventional methods used today for manufacture of wood veneer includes seasoning hardwood or logs in a predryer, cutting the wood veneer sheets from the hardwood, drying the veneer sheets in kilns, and then hot plate pressing the cut veneer sheets. However, such processing of wood veneer sheets may not eliminate the dimensional instability or warping of the sheet caused by moisture in the wood veneer and variable moisture content in the ambient atmosphere. There may still exist differences in the vapor pressures and temperatures existing in the several components of a laminate panel and particularly in the veneer sheets and in the ambient atmosphere. The continuous seeking of equilibrium or balance between the moisture in the laminate panel and in atmosphere may cause dimensional instability of the laminate panel as usually evidenced by warping of the wood veneer surface coverings. To minimize warpage under prior constructions, such sheets of wood veneer are bonded or adhesively secured to a relatively thick, rigid particle board, for example, having a thickness of one-half inch. As a result, prior proposed wood veneer laminate panels have included a relatively thick dimension and are unsuitable for very thin panels desired for covers for books, folios, notebooks, and the like.

It should be noted that thin wood veneer sheets include variable wood grain patterns and within the area of the sheet, the wood grain and its characteristics, such as light and dark sections, soft and hard sections, knots, and the like, provide different reactions to changes in moisture conditions present in the wood veneer and to changes in the degree of humidity in the ambient atmosphere. Wood has strength and hardness characteristics which may cause dimensional instability of the wood veneer sheet and in very thin panels, may result in distortion, warping, twisting, and cupping of a thin laminate panel. Instability of such a thin panel is produced by differences, between the panel and atmosphere, in temperature, humidity or moisture, and vapor pressures relating thereto. A thin veneer panel is particularly sensitive to such ambient conditions.

SUMMARY OF THE INVENTION

The present invention contemplates a wood veneer laminate panel construction which is quite thin in the order of 0.080 inches to 0.180 inches and in which novel means are provided for facilitating the exchange of moisture between wood veneer-core laminate components and ambient atmospheric conditions to provide a relatively thin laminate panel having dimensional stability and thereby utility and usefulness for a variety of products in which a thick one-half inch panel is quite unsuitable.

No practical, economical and simple method known to me has been developed for decreasing the warpage of a thin wood laminate panel in the range of about 0.080 inches to about 0.180 inches thick due to exchange of moisture resulting in expansion and contraction of the wood veneer sheets used for fabricating such a panel.

It is an object of this invention to provide a thin wood laminate panel made out of one or more wood veneer sheets so constructed that reaction to changes in moisture conditions is controlled and warpage due to atmospheric expansion and contraction of the wood veneer sheets is decreased.

It is another object of this invention to provide a thin wood laminate panel made out of one or more wood veneer sheets that, due to decreased warpage of the veneer sheets by use of the present invention, may be used for folio, notebook and book covers, or other items requiring an aesthetically appealing appearance such as a natural wood grain pattern.

It is still another object of this invention to provide a method of fabricating a thin wood laminate panel that will decrease warpage of the wood veneer sheets used for the panel.

These and other objects and advantages are attained by a thin wood laminate panel made out of one or more wood veneer sheets attached by adhesive to one or more sheets of core ply material such as chipboard. The thickness of the panel may be in the range of from about 0.080 inches to about 0.180 inches. A multiplicity of closely spaced apertures passing through the panel are made proximate to the edges of the panel in order to decrease warpage of the panel caused by moisture passing to and from the wood veneer sheets at the edges of the panel as a result of moisture passing to the atmosphere from the sheets and from the atmosphere to the sheets. The apertures are preferably closely spaced the same distance apart. The apertures may be formed by using a commercial sewing machine with a selected needle and thread to provide the stitching along the edges of the panel. The stitching with the thread in close contact with the wood provides a capillary "wicking" action facilitating transfer or conducting of the moisture from the wood veneer sheets to the atmosphere. Such stitching may also be used to additionally attach a bias material covering the edge margins of the panel. The covering helps to prevent splintering and cracking of the edges of the panel as well as adding a decorative appearance without decreasing the "wicking" and venting action of the stitching and apertures around the edges of the panel. The thin wood laminate panel may be used for notebook covers, clipboards, book covers, decorative boxes, table tops, or many other applications.

The objects and advantages of the invention are also attained by a method of fabricating a thin wood laminate panel by attaching one or more wood veneer sheets to one or more sheets of core ply material by adhesive and forming a plurality of apertures passing through the panel in proximity to at least three sides of the panel in order to decrease warpage of the panel caused by moisture passing to and from the veneer sheets.

The various features of the present invention will be best understood together with further objects and advantages by reference to the following description of a preferred embodiment taken in conjunction with the accompanying drawings.

BRIEF DESCRIPTION OF THE DRAWINGS

FIG. 1 is a perspective view of a notebook having thin wood laminate panels used as covers with a bias material covering edges of the panels and illustrating the present invention;

FIG. 2 is an exploded perspective view showing wood veneer sheets, chipboard and layers of adhesive used for one of the panels of FIG. 1;

FIG. 3 is a fragmentary cross-sectional view taken in the plane indicated by line 3—3 shown in FIG. 1;

FIG. 4 is a fragmentary cross-sectional view taken in the plane indicated by direction of line 4—4 shown in FIG. 1;

DESCRIPTION OF THE PREFERRED EMBODIMENT

Figure 5:
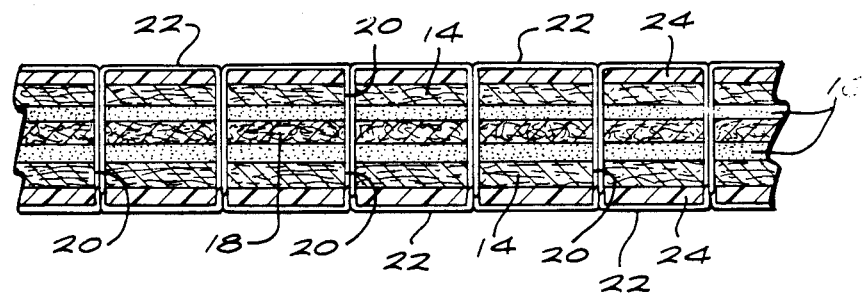
FIG. 5 is a fragmentary cross-sectional view taken in the plane indicated by direction of line 5—5 shown in FIG. 4.
Figure 6:
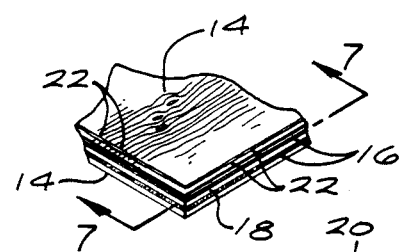
FIG. 6 is a fragmentary edge perspective view of one corner of the panel of FIG. 1 without bias material and showing stitching running along edge margins of the panel.

The following specification taken in conjunction with the drawings sets forth the preferred embodiment of the present invention in such a manner that any person skilled in the art can make and use the invention. The embodiment of the invention disclosed herein is the best mode contemplated by the inventor for carrying out his invention in a commercial environment although it should be understood that various modifications can be accomplished within the parameters of the present invention.

FIG. 1 shows a thin wood laminate panel 10 of the present invention used as a cover for a notebook 12. Referring to FIGS. 2 through 5, the panel 10 is preferably made out of two veneer layers or sheets 14 attached by an adhesive 16 -(see particularly FIG. 4) to a center layer or sheet of chipboard 18 sandwiched between the sheets 14. Any type of suitable adhesive 16 may be used such as glue or the like. In addition, any other suitable sheet of core ply material may be used instead of the chipboard 18 that will provide a desired stiff, rigid support for the veneer sheets 14. Also, more than one sheet of core ply material may be used if desired. It is important to note that only one sheet of veneer 14 may be used, if desired, or three or more veneer sheets 14 may also be used. It is intended that the invention not be limited by the number of laminate sheets 14 or sheets of core ply material 18 used for the thin wood laminate panel 10. Preferably, the thickness of each panel 10 is in the range of from about 0.080 inches to about 0.180 inches. However, thinner or thicker panels 10 may be used if desired. An exemplary thickness of wood veneer may be 0.025 inches although this veneer thickness may vary from 0.010 to 0.065 inches.

Figure 8:
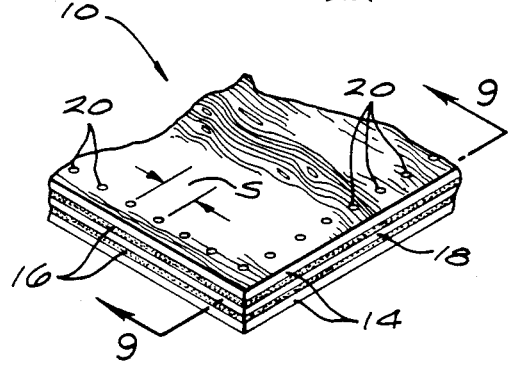
FIG. 8 is a fragmentary perspective view of one corner of the panel of FIG. 1 without bias material and showing apertures passing through the panel spaced equidistant apart along edge margins of the panel.
Figure 9:
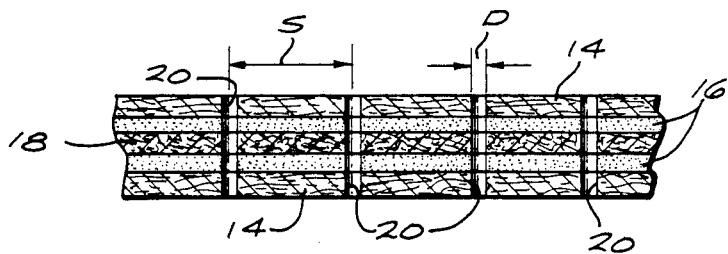
FIG. 9 is a fragmentary cross-sectional view taken in the plane indicated by line 9—9 shown in FIG. 8.

Referring now to FIGS. -4, 8 and 9, one corner of thin wood laminate panel 10 -(see FIG. 4) of FIG. 1 is shown having a plurality of closely spaced apertures 20 passing through the panel 10 adjacent to or located along the edges or outer periphery of panel 10. Warpage of panel 10 is considerably decreased by the apertures 20 as explained below. The apertures 20 are preferably equidistant apart or spaced a distance "S" apart as shown in FIGS. 8 and 9. Generally, warpage of the panel 10 is substantially decreased by a multiplicity of small-sized apertures 20 spaced closely together equal distances "S" apart. Preferably, the apertures 20 are located inwardly from the edges of the panel 10 in the range of from about 0.125 inches to about 1.50 inches. Apertures 20 may be placed closer or farther from the edges if desired. Apertures 20 may also be spaced different distances apart, if desired, so that the number of apertures 20 along one side may be different than the number used for another side. Also, the apertures 20 may be spaced different distances "S" apart along the same side of the panel 10. For example, the apertures 20 may be closely grouped or positioned in certain preselected areas where maximum warpage is expected, or positioned transversely of, or parallel to, the direction of the wood grain. The apertures 20 are preferably of the same size or diameter "D", an exemplary diameter being about 0.040 inches. The diameter "D" of the apertures may be varied, as desired, depending upon wood grain, and reactionary wood areas of maximum expected warpage and other wood veneer characteristics.

By drilling apertures 20 near the outer periphery or edges of the panel 10, warpage of the wood veneer sheets 14 or the panel 10 is considerably decreased. The apertures 20 allow retained moisture in the wood veneer sheets 14 to be "vented" to the atmosphere through the apertures 20 rather than just through the edges of the veneer sheets 14 where most warpage tends to begin and proliferate. Apertures 20 also allows moisture to pass from the atmosphere into sheets 14 to facilitate obtaining equilibrium with climactic conditions.

Figure 7:
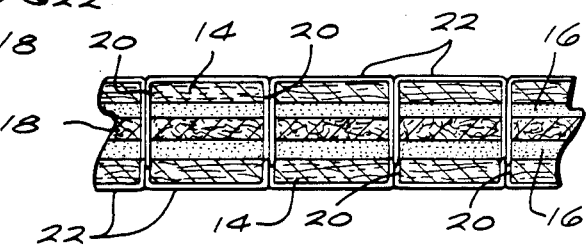
FIG. 7 is an enlarged fragmentary cross-sectional view taken in the plane indicated by line 7—7 shown in FIG. 6.

FIG. -14, 5 and shows stitching 22 used adjacent and along the outer edges of the panel 10. The stitching 22 is preferably made by a commercial sewing machine with a needle (not shown) placing or positioning the stitching 22 as shown in FIGS. 4, 5 and 7 so that the needle makes apertures 20 that pass through the panel 10. An exemplary needle for making apertures 20 may include a number 12 needle which has an OD of approximately 0.040 inches. Such a commercial sewing machine may provide largest spacing of the apertures 20 at about 4 holes per inch. Depending upon the wood veneer condition and the desired reduction of the warpage of the wood veneer, the number of stitches per inch may be increased to 40 to 60 stitches per inch which would provide very small spacing between the apertures 20. The number of stitches per inch or the number of holes per inch may thus be readily varied to provide desired venting of the panel and resultant dimensional stability of the panel.

The stitching 22 may be, for example, a No. 46, 8 oz. bonded left twisted thread of cotton, nylon-cotton, or nylon. Preferably, the thread used is capable of high capillary attraction in order to facilitate the exchange of moisture between the panel and atmosphere. Apertures 20 provide means for exchanging moisture between the wood veneer panel and atmosphere; the stitching 22 provides additional capillary "wicking" attraction that assists in the exchange of moisture. Dimensional stability of the panel is thus enhanced. Preferably, stitching 22 is located from about 0.125 inches to about 1.50 inches from the edges of panel 10. The stitching 22 may also have decorative characteristics.

A bias cover material 24 may be used along the edges of the thin wall laminate, panel 10 used for notebook 12 as shown in FIGS. 1, 4, 5 and 10. Stitching 22 is used to attach the bias cover material 24 to the edges of the panel while simultaneously making apertures 20. The bias cover 24 may be made out of leather, vinyl, cloth, paper, or any other suitable material. The bias cover 24 inhibits splintering and cracking of edges of panel 10 as well as adding a decorative appearance without decreasing the "wicking" and venting action of the stitching 22 and apertures 20. Panel 10 may be fabricated without the bias cover 24 if desired.

Preferably, the apertures 20, stitching 22 and/or bias covering 24 may extend along all four edges of panel 10. As such, apertures 20 may be positioned or run both perpendicular to and parallel to the direction of the wood grain of the veneer sheets 14. In panel 10 shown in FIG. 1, the cover material 24 cannot extend along the edge of panel 10 which is adjacent binding 26 of the notebook 12. Apertures 20 and/or stitching 22, or both, may be used along such edge adjacent the binding 26, or under binding 26, if desired. For example, stitching 22 may be used to attach binding 26 to panel 10 resulting in apertures 20 running vertically along binding 26 where it is attached to the panel 10 (like stitching 28 used for the book cover 30 shown in FIG. 10). Alternatively, binding 26 may be fastened to the panel 10 by glue or some other adhesive. In addition, bias cover material 24 may extend along the top and the bottom of binding 26 (like covering portions 24' used for the book cover 30 shown in FIG. 10).

Figure 10:
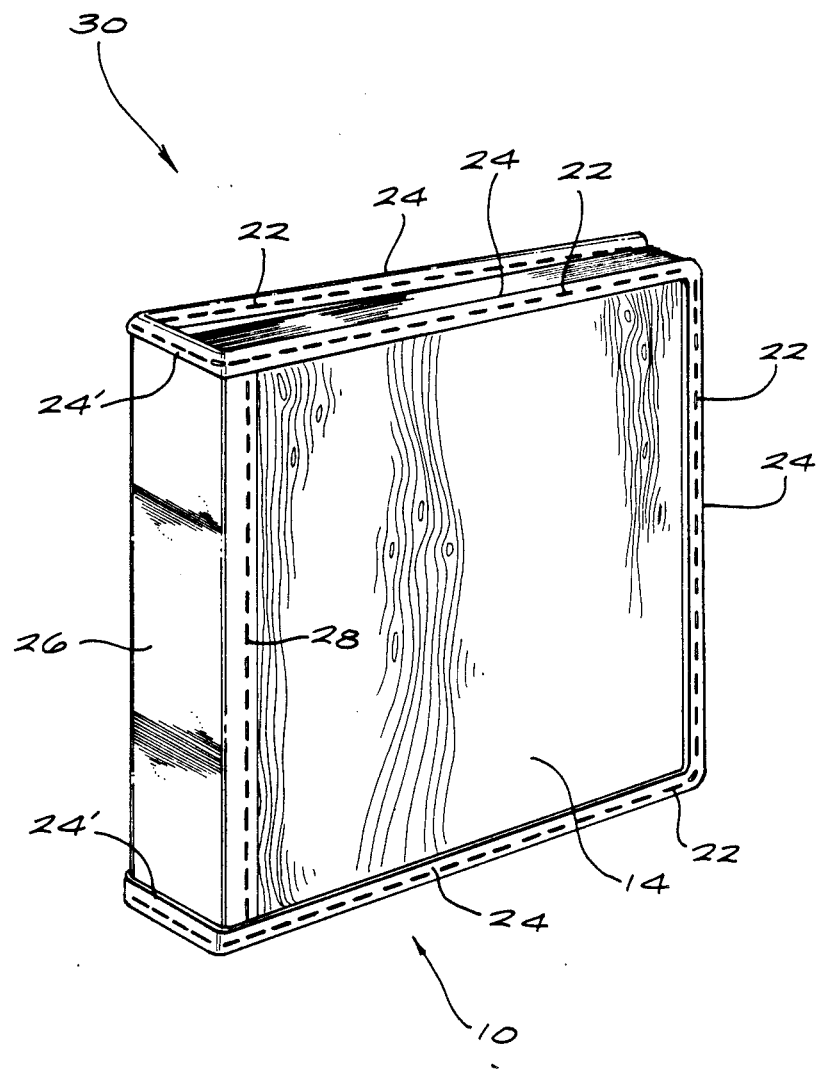
FIG. 10 is a perspective view of a book having thin wood laminate panels used as covers with bias material covering three edges of each panel and extending along top and bottom edges of the book binding, and with stitching running vertically along the binding edges where the remaining edges of the panels are attached to the binding.

FIG. 10 shows the thin wood laminate panel- 10 used as a cover for a book 30. The panel 10 uses the same wood veneer sheets 14, adhesive 16, one or more sheets of chipboard 18, apertures 20, covering 24 with stitching 22, and binding 26 as used for the notebook cover 12 of FIG. 1. In addition, portions 24' of the cover material 24 extend along the top and bottom of the binding 26. Note that vertical stitching 28 is used to attach the binding 26 to the side of the panel 10 adjacent the binding 26. The book cover 30 may be used with or without portions 24' and/or the stitching 28.

The thin wood laminate panel 10 shown in FIGS. 1 and 10 has a generally rectangular shape. The panel 10 may have a square, triangular, circular, or any other predetermined configuration with an outer periphery.

The thin wood veneer laminate panel embodying the present invention is so constructed that it may be readily adapted for use as a cover for folios, notebooks, books, boxes, and other products which include a relatively thin wall construction. One such other product may include use of a laminate panel constructed according to this invention for providing an integral one piece picture frame made by removing center portions of the panel. Wood veneers are available in many different wood grain patterns which are aesthetically pleasing and attractive. In addition, the wood veneer covers are durable, withstand abuse, and are useful when a flat firm surface may be required for writing or drawing purposes. The wood veneer provides superior thermal tactile characteristics in that its surface is neither too hot nor too cold under wide climactic conditions of use. The present invention enables thin wood veneer laminate panels to be constructed and used without the prior disadvantages of the wood veneer warping or becoming distorted because of changing atmospheric conditions.

The advantage of the present invention by providing means for enhancing equilibrium between the moisture state of the wood veneer panel and the moisture state of the atmospheric conditions permits very thin wood veneer laminate panels to be constructed and used as described above. While generally the stitching to provide apertures and thread at uniformly spaced intervals along and proximate to the edge of the laminate panel will control such warpage of the panel to an unobjectionable state, it will be apparent to those knowledgeable of the characteristics of grain patterns in wood veneers that the type of stitching, the number of stitches per inch, the type of thread, may be readily varied to accommodate anticipated reaction of the specific wood grain pattern of the wood veneer sheet being used so that the problem of warpage or dimensional instability of the laminate panel will be substantially solved.

Further, the present invention contemplates that the stitching may be in one or more rows along the edge margins of the panel. The types of stitching may vary, including embroidery and other decorative stitching. The invention also contemplates that the core material may be medium density fiberboard (wood flour), particle board or compressed clip board, and hard board such as masonite. Such above mentioned core material does not include directional grain and the core does not react as a cross ply having such grains. Some core material may be use with a thickness of only 1/16 inches. Thus thin flat attractive wood veneer panels may be fabricated for many purposes.

The above description discloses the preferred embodiment of the present invention. However, persons of ordinary skill in the art are capable of numerous modifications once taught these principles. Accordingly, it will be understood by those skilled in the art that changes in form and details may be made to the above-described embodiment without departing from the spirit and scope of the invention.

I claim:

1. A thin wood laminate panel comprising:
   at least one predried wood veneer sheet;
   at least one sheet of predried core ply material glued to said veneer sheet with no dead space therebetween; said sheets forming a panel with a predetermined configuration having an outer peripheral edge;
   said veneer sheet being permanently stitched by thread to said sheet of core ply material both parallel to and perpendicular to the grain of said sheets thereby providing a plurality of spaced apertures all the way through said sheets and proximate to at least a part of said outer peripheral edge thereof with threading in said apertures adjacent said outer peripheral edge, said threading providing capillary action to conduct moisture from said wood veneer sheet to said atmosphere and to pass said moisture from said atmosphere to said wood veneer sheet in order to decrease warping of said panel by the conducting of moisture from said wood sheet to atmosphere and passage of moisture from said atmosphere to said wood veneer sheet through said apertures, said part of said peripheral edge including at least two adjoining edges of said panel configuration.

2. The thin wood laminate panel of claim 1. wherein said apertures extend around said panel configuration at said outer peripheral edge.

3. The thin wood laminate panel of claim 1. wherein said predetermined configuration of said panel comprises a polygonal shape, said apertures being adjacent at least three sides of said polygonal shape.

4. The thin wood laminate panel of claim 3 wherein said wood veneer sheet has a wood grain direction, said apertures adjacent one of said three sides are located in a first row parallel to said wood grain direction and said apertures adjacent another of said three sides are located in a second row perpendicular to said wood grain direction.

5. The thin wood laminate panel of claim 1 wherein said panel has a thickness in the range of from about 0.080 inches to about 0.180 inches, and said apertures are located from said outer peripheral of edge a distance is the range of from about 0.125 inches to about 1.50 inches.

6. The thin wall laminate panel of claim 1. further comprising a bias material stitched to said panel by said thread, said bias material extending around at least three sides of said outer peripheral edges.

7. The thin wood laminate panel of claim 6 wherein said panel comprises a cover of a book.

8. A thin wood laminate panel comprising:
   at least one predried wood veneer sheet; at least one sheet of predried core ply material forming a panel of generally rectangular configuration glued to said veneer sheet with no dead space therebetween;
   said wood veneer sheet having a wood grain direction running substantially parallel to two parallel edges of said panel and substantially perpendicular to two other edges of said panel;
   said panel having a plurality of apertures extending all the way through said sheets proximate to said edges and arranged in rows both parallel and perpendicular to said wood grain direction, said rows of apertures substantially inhibiting warping of said panel by venting of moisture from said wood veneer sheet to surrounding atmosphere through said apertures and transfer of moisture from said atmosphere to said wood veneer sheet; said apertures containing thread material permanently stitched therein providing a wicking action to conduct said moisture from said wood veneer sheet to said atmosphere and pass moisture from said atmosphere to said sheet in order to decrease warping of said panel.

9. The thin wood laminate panel of claim 8 wherein said apertures are of equal size and spaced equidistant apart.

10. The thin wood laminate panel of claim 8 further comprising:
    a bias cover stitched to said panel by said thread material, said cover extending around at least three of edges of said panel.

* * * * *